US012803845B2

(12) United States Patent
Rai et al.

(10) Patent No.: US 12,803,845 B2
(45) Date of Patent: Nov. 17, 2026

(54) AI-ENABLED REAL-TIME CHANNEL PATH DETECTION WITH PARAMETER ESTIMATION METHOD FOR GIGAHERTZ / TERAHERTZ MASSIVE MIMO

(71) Applicant: INDIAN INSTITUTE OF TECHNOLOGY KHARAGPUR, Kharagpur (IN)

(72) Inventors: Chandrashekhar Rai, Kharagpur (IN); Debarati Sen, Kharagpur (IN)

(73) Assignee: INDIAN INSTITUTE OF TECHNOLOGY KHARAGPUR, Kharagpur (IN)

( * ) Notice: Subject to any disclaimer, the term of this patent is extended or adjusted under 35 U.S.C. 154(b) by 10 days.

(21) Appl. No.: 19/023,062

(22) Filed: Jan. 15, 2025

(65) Prior Publication Data

US 2025/0350505 A1 Nov. 13, 2025

(30) Foreign Application Priority Data

May 11, 2024 (IN) ............................ 202431037273

(51) Int. Cl.
*H04L 25/02* (2006.01)
*G01S 5/02* (2010.01)

(52) U.S. Cl.
CPC ........ *H04L 25/0254* (2013.01); *G01S 5/0257* (2013.01); *H04L 25/0204* (2013.01)

(58) Field of Classification Search
CPC ..... H04L 25/00; H04L 25/02; H04L 25/0202; H04L 25/024; H04L 25/0254;
(Continued)

(56) References Cited

U.S. PATENT DOCUMENTS 7,149,264 B2 * 12/2006 Black .................. H04L 25/0204 375/136
9,660,743 B1 * 5/2017 Ashkenazi ........... H04B 17/364
(Continued)

OTHER PUBLICATIONS

Liu, S. et al., "Deep Denoising Neural Network Assisted Compressive Channel Estimation for mmWave Intelligent Reflecting Surfaces," *IEEE Transactions on Vehicular Technology*, vol. 69, No. 8, Aug. 2020, pp. 9223-9228.
(Continued)

*Primary Examiner* — James M Perez
(74) *Attorney, Agent, or Firm* — MASUVALLEY & PARTNERS; Peter Martinez

(57) ABSTRACT

The present invention discloses an automated AI-enabled mixed signal processing-based method for suitable channel path characterization in a radio propagation environment for a multi-antenna-based communication system comprising capturing dual wideband spreading of channel paths, recovering the channel paths under extremely low SNR scenario via Deep Learning (DL) assisted channel response denoising, identifying the number of unknown channel path clusters and their respective 2D spreads through a robust clustering mechanism and estimating Direction of Arrival (DoA) and Time of Arrival (ToA) of the channel paths with low computational complexity, accounting for spatial wideband effects to mitigate off-grid measurement errors via a rotation-based fine-tuning approach.

6 Claims, 10 Drawing Sheets

(58) Field of Classification Search
CPC ... H04L 25/0256; H04L 25/0204; H04L 5/00; H04L 5/003; H04L 5/0048; H04L 5/0051; G01S 5/00; G01S 5/02; G01S 5/0257
See application file for complete search history.

(56) References Cited

U.S. PATENT DOCUMENTS

| | | | | |
|---|---|---|---|---|
| 10,778,344 | B2 * | 9/2020 | Gunturi | H04L 25/0224 |
| 10,903,870 | B1 * | 1/2021 | Smyth | G01S 5/0257 |
| 11,122,397 | B2 * | 9/2021 | Pajovic | G01S 5/0226 |
| 11,624,821 | B2 * | 4/2023 | Rappaport | G01S 13/42<br>342/179 |
| 11,792,049 | B2 * | 10/2023 | Park | H04L 5/0016<br>455/456.1 |
| 11,881,966 | B2 * | 1/2024 | Bashir | H04W 64/006 |
| 12,052,121 | B2 * | 7/2024 | Yerramalli | H04W 64/003 |
| 12,166,603 | B2 * | 12/2024 | Bashir | H04L 25/0228 |
| 12,328,209 | B2 * | 6/2025 | Yerramalli | H04L 25/0254 |
| 12,388,680 | B2 * | 8/2025 | Priya | H04B 17/345 |
| 12,470,431 | B2 * | 11/2025 | Nguyen | H04L 25/03178 |
| 12,513,026 | B2 * | 12/2025 | Hu | H04L 25/0254 |
| 2005/0276364 | A1 * | 12/2005 | Black | H04L 25/0216<br>370/465 |
| 2009/0245338 | A1 * | 10/2009 | Jonsson | H04L 25/022<br>455/67.11 |
| 2011/0135022 | A1 * | 6/2011 | Dell' Amico | H04L 27/2647<br>375/316 |
| 2016/0149727 | A1 * | 5/2016 | Hu | H04L 25/0204<br>370/252 |
| 2018/0359043 | A1 * | 12/2018 | Chan | H04J 11/0036 |
| 2020/0205104 | A1 * | 6/2020 | Akkarakaran | H04W 56/009 |
| 2020/0382346 | A1 * | 12/2020 | Noureddine | H04B 7/02 |
| 2021/0021297 | A1 * | 1/2021 | Smyth | G01S 5/0257 |
| 2022/0294669 | A1 * | 9/2022 | Park | H04L 25/0232 |
| 2023/0082198 | A1 * | 3/2023 | Barbu | G01S 5/0045<br>370/450 |
| 2023/0275785 | A1 * | 8/2023 | Nguyen | H04L 25/03318<br>370/328 |
| 2023/0379194 | A1 * | 11/2023 | Priya | H04B 17/345 |
| 2023/0388158 | A1 * | 11/2023 | Hu | H04L 25/0254 |
| 2024/0048412 | A1 * | 2/2024 | Park | H04L 5/001 |
| 2024/0113916 | A1 * | 4/2024 | Bashir | H04W 64/006 |
| 2024/0314001 | A1 * | 9/2024 | Yerramalli | G01S 5/0278 |
| 2025/0167835 | A1 * | 5/2025 | Obeid | H04L 25/0256 |
| 2025/0220383 | A1 * | 7/2025 | Satloff | G10L 19/008 |
| 2025/0350505 | A1 * | 11/2025 | Rai | H04L 25/0254 |
| 2025/0385824 | A1 * | 12/2025 | Reddy | H04L 27/2639 |
| 2026/0093008 | A1 * | 4/2026 | Rai | G01S 5/22 |

OTHER PUBLICATIONS

Jian, M. et al., “Angle-Domain Aided UL/DL Channel Estimation for Wideband mm Wave Massive MIMO Systems With Beam Squint,” *IEEE Transactions on Wireless Communications*), vol. 18, No. 7, Jul. 2019, pp. 3515-3527.

He, H. et al., “Deep Learning-Based Channel Estimation for Beamspace mmWave Massive MIMO Systems,” *IEEE Wireless Communications Letters*, vol. 7, No. 5, Oct. 2018, pp. 852-855.

Wang, B. et al., “Load Balancing and Latency Reduction in Multi-User COMP over TWDM-VPONs,” *2016 IEEE Transactions on Signal Processing*, Jul. 1, 2018, vol. 66, No. 13, pp. 3393-3406.

Sun, X. et al., “Single-Site Localization Based on a New Type of Fingerprint for Massive MIMO-OFDM Systems,” *IEEE Transactions on Vehicular Technology*, vol. 67, No. 7, Jul. 2018, pp. 6134-6145.

* cited by examiner

AI-ENABLED REAL-TIME CHANNEL PATH DETECTION WITH PARAMETER ESTIMATION METHOD FOR GIGAHERTZ / TERAHERTZ MASSIVE MIMO

RELATED APPLICATIONS

This application claims priority to India Patent Application No. 202431037273, Filing Date May 11, 2024, entitled AI-ENABLED REAL-TIME CHANNEL PATH DETECTION WITH PARAMETER ESTIMATION METHOD FOR GIGAHERTZ/TERAHERTZ MASSIVE MIMO; which is incorporated herein by reference in its entirety.

FIELD OF THE INVENTION

The current invention generally relates to wireless communication. In specific, this invention is oriented towards providing an automated method of detecting channel paths and their parameter estimation in a static radio environment for (GHz) ex. millimeter-wave an End-to-End next-generation GigaHertz (mmWave)/TeraHertz (THz) massive multi-antenna communication basedsystems. In this invention, the path detection and its parameter estimation involves realistic assumptions of spatial wideband effect and ultimately provides extremely low SNR conditions. The proposed invention advantageously presents a novel first-of-its-kind AI-enabled mixed signal processing framework for the channel path characterization in three folds viz. i. recovering the channel path clusters under extremely low SNR scenario via Deep Learning (DL) assisted channel response Denoising, ii. developing a robust clustering mechanism for identifying the unknown number of path clusters and the respective 2D spreads, and iii. a low-complexity rotation-based fine-tuning mechanism for computationally efficient DoA-ToA estimation of the channel paths to mitigate the off-grid measurement errors.

BACKGROUND OF THE INVENTION

The wireless signals originating from various scattering or reflecting objects reach to the elements of an antenna array at different temporal delays (Temporal delay refers to the time taken for a signal or data packet to travel from the transmitter (Tx) to the receiver (Rx). This delay can affect the overall performance and responsiveness of communication systems, and it can be measured by analyzing the time difference between sending a command and receiving its consequences) due to the radial distance and spatial delays resulting from the inter-element spacing. These spatial delays, coupled with the array geometry, are leveraged to extract the particular scatterar's Direction of Arrival (DoA) information. The temporal delay associated with the objects is used for Time of Arrival (ToA) and, hence, the range estimation. Together, the number of incoming paths and their DoA and ToA define the channel signature. In wireless communication systems, these channel signatures play a crucial role in channel estimation with minimal parameters and in tasks such as transmit/receive BeamForming (BF) and spatial multiplexing. Conversely, in radar applications, extracting these signatures is vital for the target localization. Traditional communication systems typically approximate the spatial delays across the array elements solely through phase shift terms under the narrowband assumption. However, this approximation becomes inaccurate when the instantaneous signal Bandwidth (BW) is comparable to the reciprocal of the delays at the array level. Such a scenario is quite obvious in GHz(ex. mmWave)/THz multi-antenna communication systems causing the Spatial Wideband Effect (SWE) due to which the channel paths are spread jointly in the angle-delay domain. More importantly, in a practical scenario the mmWave/THz signals experience a very low Signal-to-Noise Ratio (SNR) due to several factors causing a very low detectability even to the useful paths. Although, the on-grid methods are computationally efficient for the path parameter estimation in a real time system, the accuracies of these methods are limited due to the presence of off-grid input signatures. Hence the path detection and its accurate DoA-ToA parameter estimation under the SWE (Spatial Wideband Effect) and ultra-low SNR scenarios is critically important for the mmWave/THz massive multi-antenna systems.

Reference of the prior arts relating to the present invention are invited as follows:

| Prior Art (Publications) | Differences |
|---|---|
| Sun, X., Gao, X., Li, G. Y., & Han, W. (2018). Single-site localization based on a new type of fingerprint for massive MIMO-OFDM Systems. *IEEE Transactions on Vehicular Technology*, 67(7), 6134-6145 | Current Solution<br>MIMO-OFDM (massive multiple-input multiple-output (MIMO) orthogonal frequency-division multiplexing (OFDM) systems<br>SWE is not considered<br>Fingerprinting-based method<br>Require offline fingerprint collection |
| Wang, B., Gao, F., Jin, S., Lin, H., & Li, G. Y. (2018). Spatial-and frequency-wideband effects in millimeter-wave massive MIMO systems. *IEEE Transactions on Signal Processing*, 66(13), 3393-3406 | Current Solution<br>SWE is considered<br>Rotation-based DoA-ToA estimates<br>Ultra-low SNR is not considered<br>No specific clustering mechanism is given<br>Bin shifting due to SWE is not considered |
| Jian, M., Gao, F., Tian, Z., Jin, S., & Ma, S. (2019). Angle-domain aided UL/DL channel estimation for wideband mmWave massive MIMO systems with beam squint, *IEEE transactions on wireless communications*, 18(7), 3515-3527. | Current Solution<br>SWE is considered<br>SBL-based DoA-ToA estimation<br>Very high Computational Complexity |
| He, H., Wen, C. K., Jin, S., & Li, G. Y. (2018). Deep learning-based | Current Solution<br>Lens array geometry |

-continued

| Prior Art (Publications) | Differences |
|---|---|
| channel estimation for beamspace mmWave massive MIMO systems. *IEEE Wireless Communications Letters*, 7(5), 852-855. | deep-learning (DL)-based denoising is utilized for channel estimation<br>SWE is not considered<br>DoA-ToA estimates are not carried out |
| Liu, S., Gao, Z., Zhang, J., Di Renzo, M., &Alouini, M. S. (2020). Deep denoising neural network channel assisted compressive estimation for mmWave intelligent reflecting surfaces. *IEEE Transactions on Vehicular Technology*, 69(8), 9223-9228. | Current Solution<br>Compressive sensing-based channel estimation for IRS systems<br>Complex-valued DnCNN is utilized for removing sampling noise and enhancing the estimation<br>SWE is not considered<br>DoA-ToA is not estimated |

| Prior Art (Patents) | Differences |
|---|---|
| Rappaport, Theodore S. "System, method and computer-accessible medium for real time imaging using a portable device." U.S. Pat. No. 11,624,821. 11 Apr. 2023. | Current Solution<br>mmWave radio device based imaging system<br>real-time DoA-ToA estimation is addressed<br>SWE is not considered |
| Pajovic, Milutin, et al. "Localization using millimeter wave beam attributes." U.S. Pat. No. 11,122,397. 14 Sep. 2021. | Current Solution<br>mmWave beam-training based method requires offline training for fingerprinting<br>SWE is not considered |

Although, the on-grid methods are computationally efficient for the path parameter estimation in a real time system, the accuracies of these methods are limited due to the presence of off-grid input signatures. Hence the path detection and its accurate DoA-ToA parameter estimation under the SWE (Spatial Wideband Effect) and ultra-low SNR scenarios is critically important for the mmWave/THz massive multi-antenna systems.

OBJECT OF THE INVENTION

Primary objective of the present invention is to provide a method of detecting the channel paths and their parameter estimation in a static radio environment for an End-to-End next-generation GigaHertz (GHz) ex. millimeter-wave (mmWave)/TeraHertz (THz) massive multi-antenna based communication systems.

Another objective of the present invention is to provide a method wherein restrictions from finite basis on spatial wideband systems would be modelled through Fourier analysis in order to capture the dual wideband spreading of mmWave massive MIMO channel paths.

Another objective of the present invention is to provide said method wherein a novel Deep Learning based channel response denoising method would be introduced for extracting scatter/target of spatial wideband systems in ultra-low SNR.

Another objective of the present invention is to provide said method wherein a low-complexity rotation-based fine-tuning mechanism would be proposed for mitigating the grid mismatch effect and a two-stage coarse correction method for fine-tuned DoA-ToA estimation would be implemented for handling the angle-delay squinting effect in spatial wideband systems.

SUMMARY OF THE INVENTION

Thus, according to the basic aspect of the present invention there is provided an automated AI-enabled mixed signal processing-based method for suitable channel path characterization in a radio propagation environment for a multi-antenna-based communication system comprising

- capturing dual wideband spreading of channel paths;
- recovering the channel paths under extremely low SNR scenario via Deep Learning (DL) assisted channel response denoising;
- identifying the number of unknown channel path clusters and their respective 2D spreads through a robust clustering mechanism; and
- estimating Direction of Arrival (DoA) and Time of Arrival (ToA) of the channel paths with low computational complexity, accounting for spatial wideband effects to mitigate off-grid measurement errors via a rotation-based fine-tuning approach.

In the above method, recovering the channel paths involves a Denoising Convolutional Neural Network (DnCNN) to recover paths with very low amplitude in the presence of high receiver noise, comprising the steps of:

- applying a 2D Inverse Discrete Fourier Transform (IDFT) to delay-angle channel response;
- normalizing absolute channel response to the range [0, 1];
- denoising the channel response using a pre-trained DnCNN;
- normalizing cleaned image back to the absolute channel response; and
- further denoising the absolute channel response for input into clustering process.

In the above method, the robust clustering mechanism uses a Local Gravitation-based Clustering (LGC) framework to identify physical paths and their respective 2D spreads in the delay-angle domain of the denoised channel response, comprising the steps of:

denoising the absolute channel response;

preparing the clustering dataset by applying percentile-based hard thresholding;

implementing prior-free LGC clustering to identify the number of physical paths and their respective spreads.

In the above method, the low-complexity rotation-based fine-tuning based computationally efficient estimation of DoA and ToA includes a. involving the clusters with their angle-delay support;

b. identifying peak of every of the clusters correspondingly from the angle-delay channel response;

c. setting peak bins as the coarse bins if the channel response less than 0.05;

d. alternatively setting maximum neighborhood for 2D spread if the channel response is equal or greater than 0.05 subsequently conjugating space-channel matrix with phase shift matrix using the peak bin of angle and rotating around neighborhood of every peak and assigning maximum as to correct coarse bin repeatedly for every cluster and finally coarse tuning the estimate, Grid-2 maximum Fine tuned DoA-ToA estimate;

e. coarse tuning the DoA-ToAbins and space frequency channel response;

f. conjugating space frequency channel;

g. rotating space frequency channel;

h. rotating 2D-IDFT Delay-Angle channel;

i. finding maximum valued rotation Grid-1;

j. initiating a first step rotation including setting fine grid around coarse bin and also initiating a second step rotation including setting finer grid around maximum of Grid 1 whereby after first step rotation the steps of (g)-(i) are repeated for every grid point and after second step rotation the steps of (g)-(i) are repeated for every grid point to find maximum valued rotation Grid-2;

k. coarse tuning the estimate, Grid-2 maximum fine tuned DoA-ToA estimate.

In the above method, an end-to-end AI-enabled end-to-end low complexity solution for the channel path detection and parameter estimation in mmWave/THz multi-antenna systems with the spatial wideband assumption comprises the steps of least square (LS) estimated noisy angle-delay response denoised in DL-based denoising;

normalizing absolute value of the angle-delay channel response values in the range of [0,1] to represent the grayscale image equivalent of the channel;

passing through the pre-trained DnCNN network to get the clean channel image which is normalized back to the absolute valued angle-delay channel response and subjected to percentile-based hard threshold to prepare the clustering dataset;

obtaining datasheet supplied to the prior-free LGC clustering and the cluster output with respective angle-delay cluster supports is achieved for coarse estimation followed by a fine-tuning around the corrected coarse bin via the proposed low complexity rotation.

In the above method, fine tuning of the coarse DoA-ToA estimation is carried out by the low-complexity two-step rotation mechanism including dividing the entire fine-tuning search grid into the hierarchal two-step grids with quite less number of points;

removing partially the SWE at the first path-wise by multiplying with a conjugate of phase shift matrix as constructed using structure with coarse DoA; setting around a fine-grid for every path around the coarse and the space-frequency channel matrix which is rotated by a rotation matrix;

comparing a power for the rotated angle-delay channel for every point in first grid and selecting the maximum;

setting a finer grid around this maximum and rotating the space-frequency channel for each grid point;

selecting the maximum power grid point among all the rotated angle-delay channels from subsequent grid and adding to the coarse estimates to yield the fine-tuned DoA-ToA estimates.

DETAILED DESCRIPTION OF THE INVENTION

The present invention relates to path detection and its parameter estimation of a radio propagation environment for GHZ (mmWave)/THz multi-antenna systems with the realistic assumptions of spatial wideband effect and extremely low SNR conditions.

In the primary embodiment of the present invention discloses a novel first-of-its-kind Artificial Intelligence-enabled automated mixed signal processing framework for the channel path characterization in three folds—1) recovering the channel path clusters under extremely low SNR scenario via Deep Learning (DL) assisted channel response Denoising, 2) developing a robust clustering mechanism for identifying the unknown number of path clusters and the respective 2D spreads, and 3) a low-complexity rotation-based fine-tuning mechanism for computationally efficient DoA-ToA (time of arrival (TOA) and direction of arrival (DOA)) estimation of the channel paths to mitigate the off-grid measurement errors.

Another embodiment of the present invention provides Denoising Convolution Neural Network (DnCNN) based channel response recovery of the paths with very low amplitude channel gain coupled with the presence of ultra-high receiver noise. Later, a Local Gravitation based Clustering (LGC) framework is developed to identify the number of physical paths for and their respective spreads/support in the delay-angle domain of the denoised channel response. More importantly, the novel denoising and clustering performance assessment metrics specific to the AI-enabled framework are developed for wireless applications. Finally, after getting the AI-assisted successful coarse estimation of paths, we fine-tune the DoA-ToA estimates for the each recovered path via the proposed low-complexity rotation-based methods.

Figure 1:
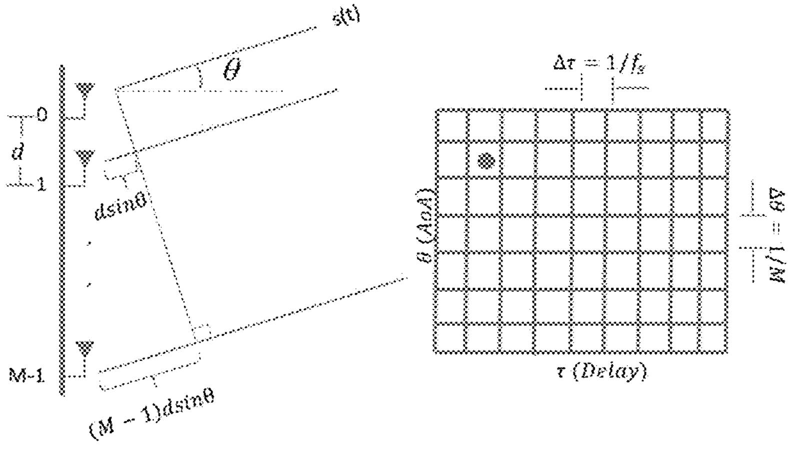
FIG. 1: A ULA (Uniform Linear Array) based system model for mmWave Massive MIMO system with illustration of channel signature.

In another embodiment the present invention models for a massive MIMO system (MIMO stands for Multiple-Input Multiple-Output, and it's a wireless technology that uses multiple transmitters and receivers to transfer data simultaneously) operating in the mmWave frequency range, featuring a receiver with a Uniform Linear Array (ULA) geometry, as illustrated in FIG. 1.

The received baseband signal from a source, ignoring the mobility effect can be written as $$y_r(t) = \sum_{l=1}^{L} \beta_l x(t - \tau_{0,l} - \tau_{r,l}) e^{-j2\pi f_c(\tau_{0,l}+\tau_{r,l})} + e_r(t) \tag{1}$$

Where $$t_{0,l} = \frac{r_l}{c}$$

is the radial delay due to the distance from the source to the first (reference) element of the antenna array and $$t_{r,l} = r\frac{d\sin\tilde{\theta}_l}{c}$$

is the spatial delay across the antenna array for the $1^{th}$-path, $\beta_i$ is the channel path gain and $e_r(t)$ is the complex Additive White Gaussian Noise (AWGN) which follows $CN(0,s^2)$. By defining the delay and angle steering vectors as $d(\tilde{\tau}_l) \triangleq [1\ e^{j2p\tilde{\tau}_l} \ldots e^{j2p(N-1)\tilde{\tau}_l}]^T$ and $c(\tilde{\theta}_l) \triangleq [1\ e^{j2p\tilde{\theta}_l} \ldots e^{j2p(R-1)\tilde{\theta}_l}]^T$ respectively, we can write the equivalent channel in the matrix-vector form as $$H = \sum_{l=1}^{L} \tilde{\beta}_l c(\tilde{\theta}_l) d(\tilde{\tau}_l) o S(\alpha, \tilde{\theta}_l) + E \tag{2}$$

Where, $\tilde{\beta}_l \triangleq \beta_l e^{-j2\pi f_c \tau_{o,l}}$ is the equivalent complex path gain and $$S(a, \tilde{\theta}_l) \stackrel{\Delta}{=} \exp\left(-j2p\frac{a}{N}\tilde{\theta}_l rn\right)$$

and is the wideband phase shift matrix and o denotes the element-wise product between the matrix elements. Finally, the channel parameters of interest to be estimated are $\{\tilde{\beta}_l, \tilde{\theta}_l, \tilde{\tau}_l, L\}$. The received signal arriving at multi-antenna RF front-end captures the wireless channel in the space-frequency domain and is processed to get the 2D angle-delay channel response to take advantage of channel sparsity.

In one embodiment of the present invention it can be noticed that for a high BW (Bandwidth) selection parameter $\alpha=0.05$, the symbol duration is quite less so that the spatial propagation delay of a path across the array aperture of massive antenna-size R, is non-negligible and the spatial narrowband assumption does not hold true anymore. Due to the spatial wideband effects, extra phase shift matrix $S(\alpha,?_l)$ in the space-frequency channel model appears and the path DoA-ToA cannot be directly estimated. In this disclosure, we propose the channel path DoA-ToA estimation for such spatial wideband systems with a low computational complexity.

Transform Domain Advantage/Limitations:

In another embodiment the practical wireless channel is sparse at the mmWave/THz frequencies of operation in the delay-angle domain. Hence the channel estimation of a high dimensional multi-antenna multi-carrier system can be carried out with a very less number of parameters in the delay angle-domain, e.g. R×N=128×128, $128^2$ complex parameters need to be estimated in the space-frequency domain whereas only 3L parameters are needed to be estimated in the angle-delay domain for L number of physical paths.

Figure 2:
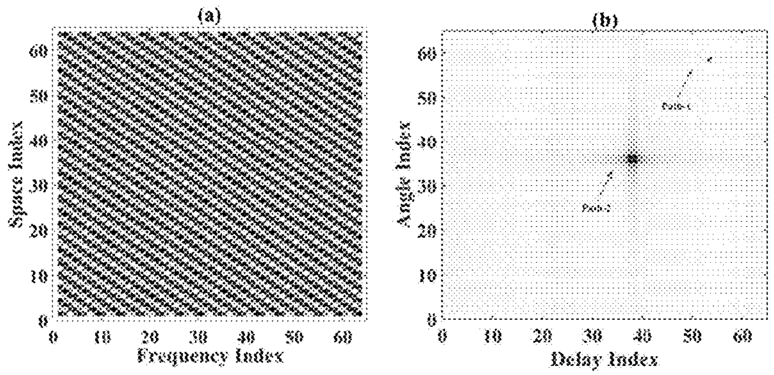
FIG. 2 Channel response image equivalent with 2-physical paths for spatial narrowband systems (a) non-sparse in frequency domain (b) sparse in angle-delay domain FIG. 3 Channel response image equivalent for 5-physical paths with $\alpha$=0.2 (a) without noise (b) with noise

The channel sparsity in angle-delay domain can be seen from the channel image equivalent for a spatial narrowband system as shown in FIG. 2. As can be seen from FIG. 2(*b*) that the path-1 with integer multiple of the bin-resolution is perfectly localized and the path-2 with non-integer multiple of bin resolution leaks the power in the angle-delay domain. However, for a high measurement grid the most of the power is still concentrated around the adjacent bins to the actual input signature hence the peaks present in the angle-delay spectrum gives the coarse signature estimation (more importantly this is true only for the spatial narrowband system). Once, the coarse signatures are obtained, we can implement some fine-tuning mechanism to mitigate the grid-mismatch error rather than going for the direct off-grid methods that are too much computationally involved to be implemented in a real-time scenario.

Figure 3:
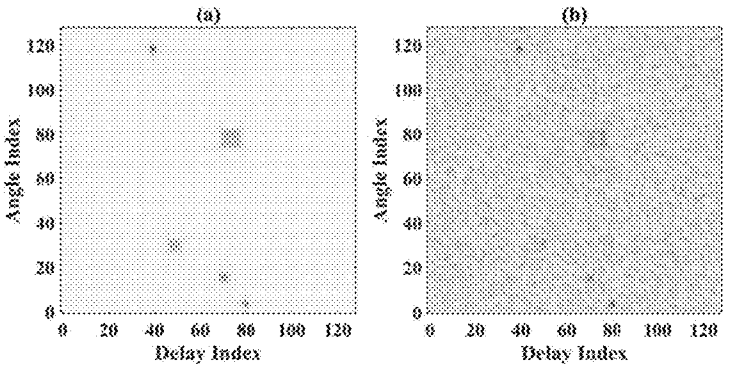

The channel response image can reflect the channel paths presence. However, due to the ultra-low SNR conditions at mmWave/THz frequencies, the channel response image can be too noisy to depict these channel paths as shown in FIG. 3.

Figure 4:
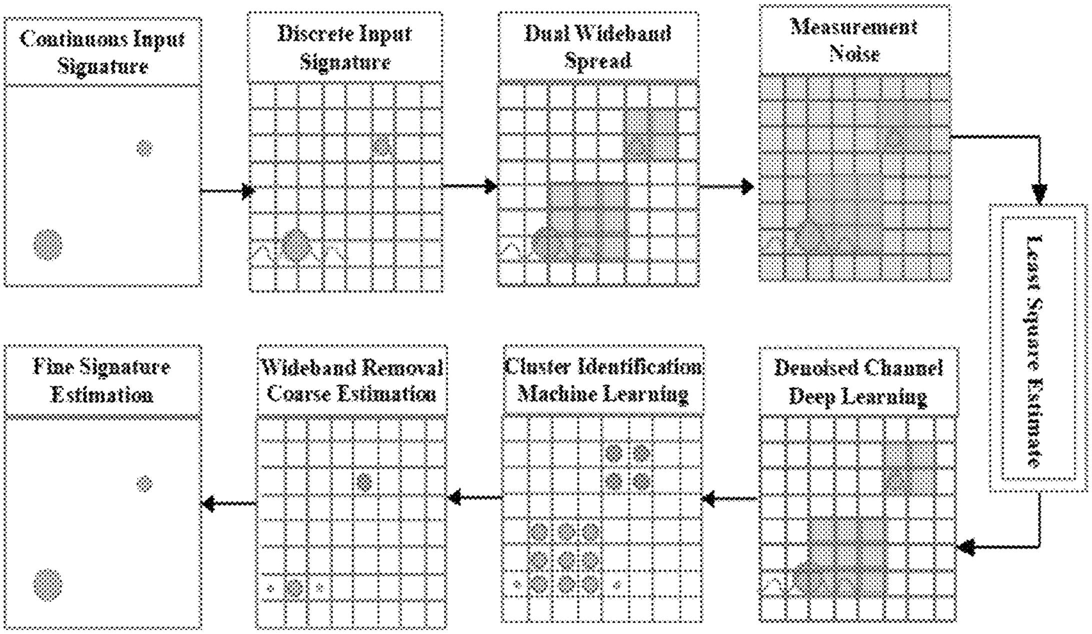
FIG. 4: Schematic of challenges and solution involved in the channel path signature estimation

In another embodiment we summarized the above-mentioned effects and then proposed solution framework at channel level as depicted in FIG. 4. The continuous delay-angle channel path signatures are measured at a discrete angle-delay grid and the leakage is inexorable (impossible to stop or prevent.) whenever there is a grid mismatch. Moreover, due to the practical spatial wideband assumption arriving at mmWave/THz frequencies causes the paths to spread further in the angle-delay domain followed by a high measurement noise and ultra-low SNR conditions.

In another embodiment the initial low complexity Least Squares (LS) channel estimate is carried out and the space-frequency response is converted to the angle-delay domain. Later to increase the path identifiabilty in the ultra-low SNR conditions the angle-delay channel response is denoised through the advance DL-based method. Later the robust clustering mechanism is applied to identify the unknown apriori number of path clusters along with path spreads. Subsequently, the spatial wideband effect is removed and the proper coarse estimation is done followed by a low-complexity fine-tuning mechanism developed.

Proposed AI-Enabled Framework

Figure 5:
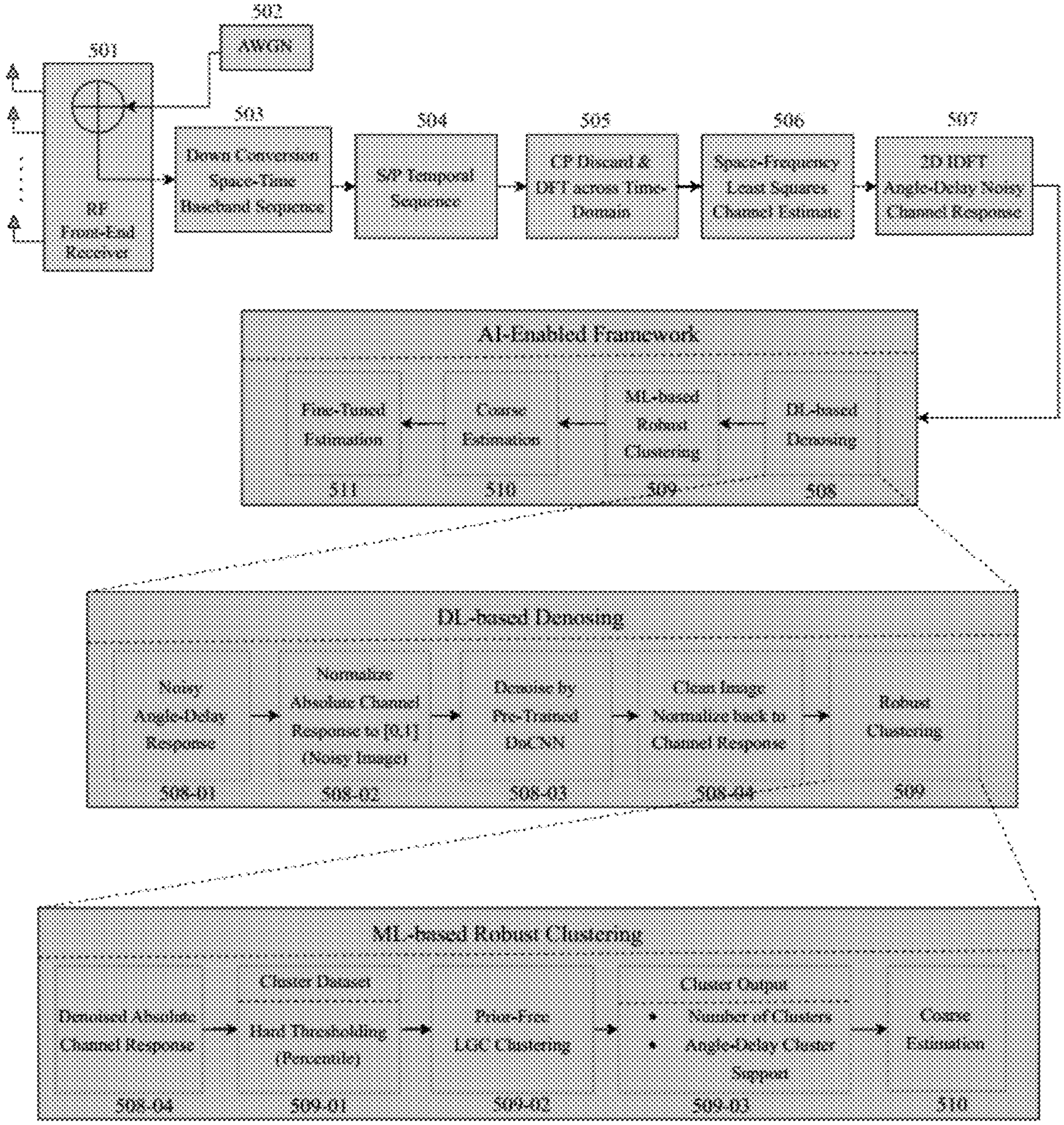
FIG. 5: Proposed AI-enabled framework for channel path detection and parameter estimation

To handle the three major challenges discussed above and harness the channel sparsity for the channel path detection and parameter estimation in mmWave/THz multi-antenna systems with the spatial wideband assumption, we propose an end-to-end AI-enabled end-to-end low complexity solution as depicted in FIG. 5.

The RF signal is received at the RF-front end receiver block 501 and processed according to the noise added from block 502. The noise-corrupted received signal is first down-converted to get the space-time baseband sequence at 503 followed by the serial-to-parallel conversion through 504. Then, we discard the Cyclic Prefix (CP), and take the Discrete Fourier Transform (DFT) at 505, and get the space-frequency noisy channel response via Least Squares (LS) channel estimation at 506. By taking inverse DFT, we get the equivalent noisy angle-delay channel response at 507. Our proposed AI-enabled framework blocks are 508-511.

DL-based denoising 508: requires the noisy angle-delay channel response as the input at 508-01. At first, we normalize the typical channel response to the grayscale image in the range [0,1] to get the noisy channel image response via block 508-02. Then, we denoise the channel response by the pre-trained Denoising Convolution Neural Network (DnCNN) at block 508-03. Subsequently, we convert the clean channel image back to the absolute channel response at 508-04 and is fed to the robust clustering.

Robust Clustering 509: requires the denoised absolute channel response from the 508-04. At first, we prepare the clustering dataset, via percentile-based hard thresholding applied over the denoised channel response at block 509-01. We feed the prepared 2D dataset to the Local Gravitation based Clustering (LGC) 509-02 which is robust in the sense as it does not require any additional prior on the number of clusters. The clustering output shown in block 509-03 contains the number of clusters and the respective 2D delay-angle support for each identified cluster which is fed to the coarse-to-fine tune estimation blocks 510-511.

Figure 6:
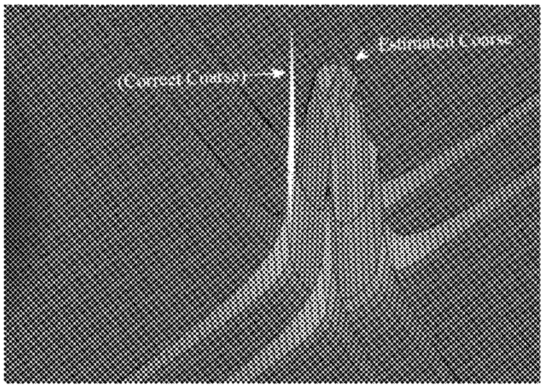
FIG. 6: Coarse bin shifting due to the spatial wideband effect.

Unlike the spatial narrowband systems, in a spatial wideband system the maximum of a cluster is shifted due to the SWE and cannot be allocated to be the approximate value of the coarse bin as shown in FIG. 6. Hence, novel to this identification, we propose a two-stage rotation mechanism where, in the first stage a coarse bin correction is done as described in FIG. 7 followed by a fine-tuning around the corrected coarse bin via the proposed low complexity rotation.

The coarse estimation method takes the clusters with corresponding angle delay-support from block 509-03. At the very first step, it finds the peak of all the clusters present at block 510-01. If the system bandwidth is low, i.e., if $\alpha \leq 0.05$, we directly declare the idefintied peaks the coarse bins from 510-02. However, for spatial wideband systems ($\alpha \geq 0.05$), we correct the peak bin via block 510-03 to get the coarse bin estimate. Accordingly, we set the maximum 2D neighborhood in block 510-03(*a*) for the given system parameters. E.g., For a system with 128 antenna elements and $\alpha=0.1$, the maximum leakage is in ceil($R*\alpha$)=ceil(12.8), i.e., 13×13 bins. We conjugate the channel response by the phase shift matrix at the peak bin in block 510-02(*b*). We rotate around the every peak in the neighborhood and select the maximum as the correct coarse bin from block 510-03 (*c*).

Proposed Low Complexity Rotation

In another embodiment the channel path detection and estimation can be directly evaluated by the angle-delay spectrum calculated by practical low-complexity Discrete Fourier Transform (DFT)-based method. However, due to the finiteness in the space-frequency samples, the path parameter estimation accuracy is restricted to the DFT's bin resolution. Still, the coarse bins can be estimated by picking the peaks of the angle-delay spectrum and the fine-tuning around these coarse DoA-ToA bins can be done with the rotation method. By rotating around the coarse bin the DoA-ToA accuracy can be arbitrarily increased and depends upon the number of fine-tuning grid points in the rotation.

Figure 8:
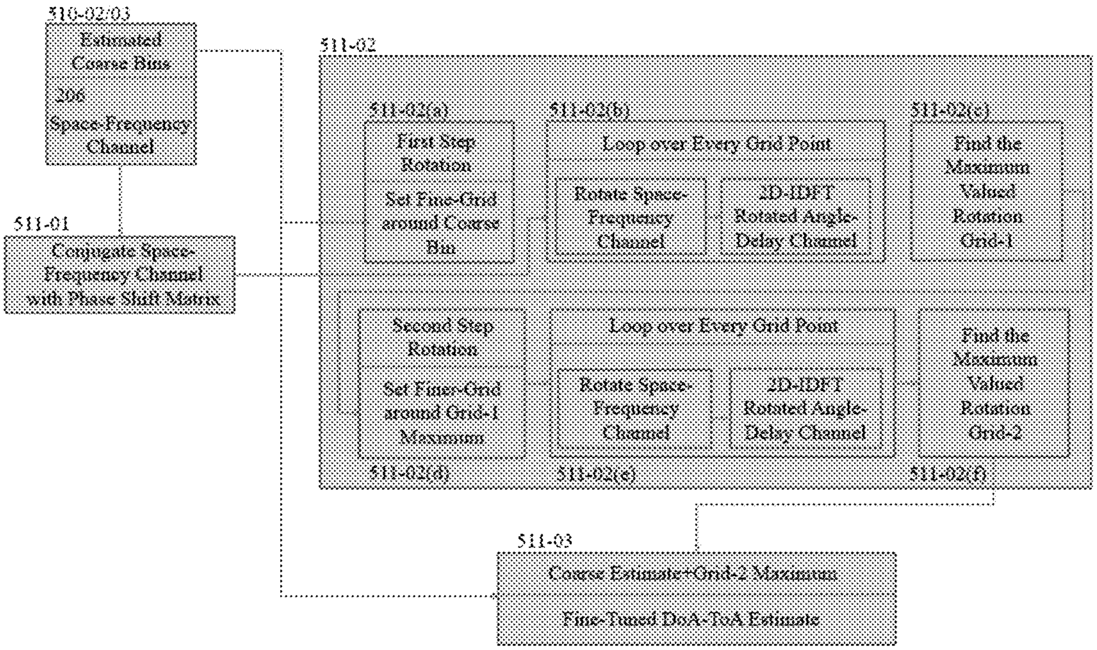
FIG. 8: Low-complexity two-step rotation for fine-tuning the DoA-ToA estimates.
Figure 8A:
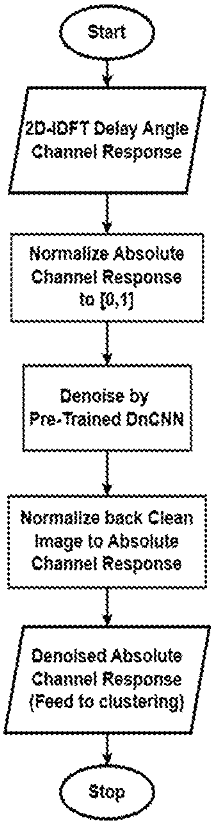
FIG. 8*a*: Flow chart for recovering the channel paths.
Figure 8B:
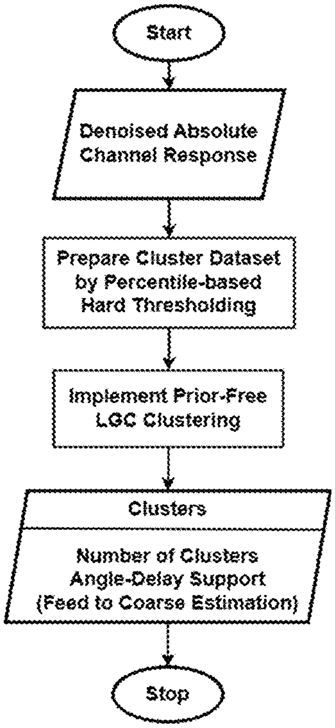
FIG. 8*b*: Flow chart for robust clustering mechanism.
Figure 8C:
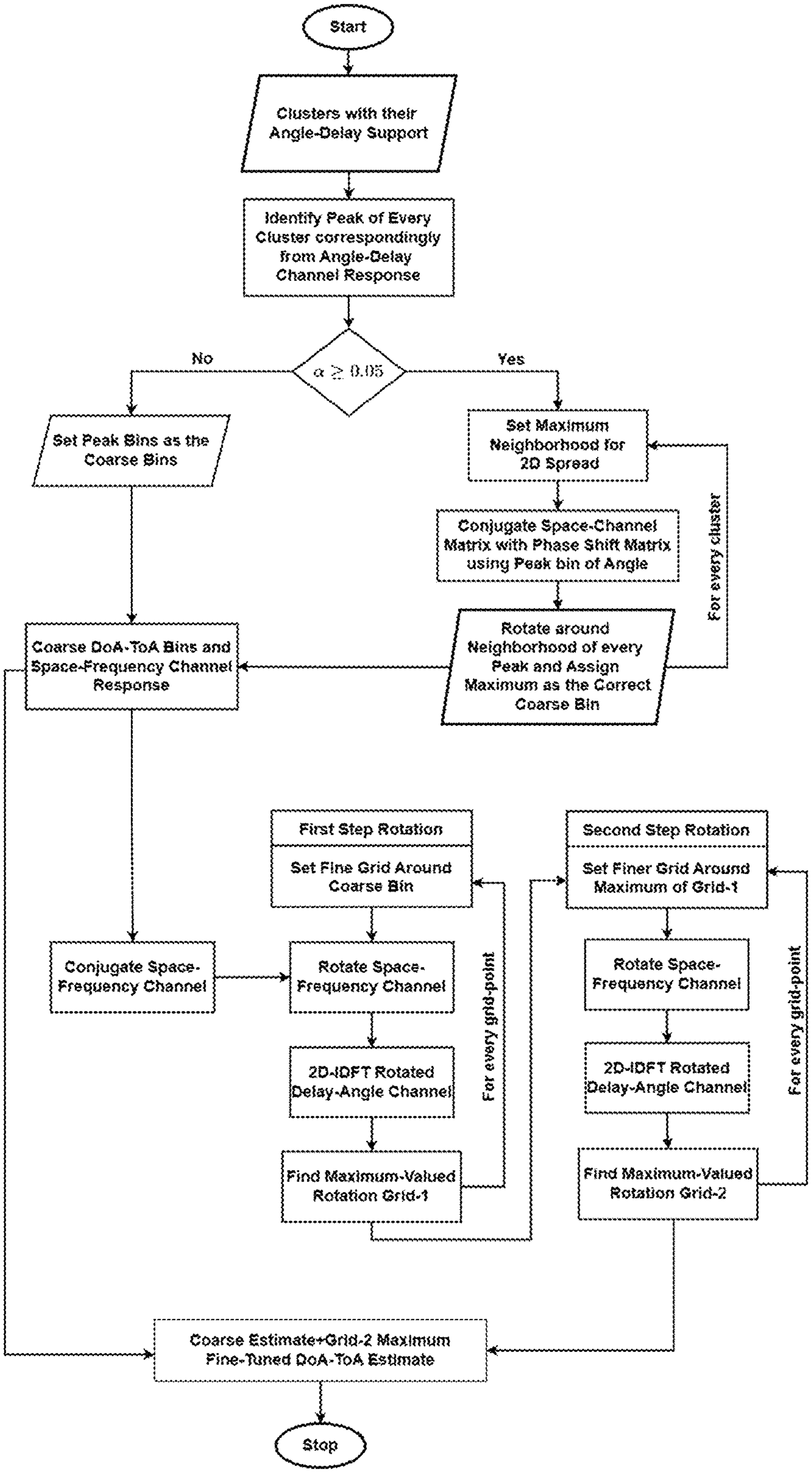
FIG. 8*c*: Flow chart for DoA and ToA estimation.

Hence, in another embodiment of the present invention a low-complexity two-step rotation mechanism is proposed for fine tuning of the coarse DoA-ToA estimation in which the entire fine-tuning search grid is divided into hierarchal two-step grids with quite less number of points in each step as shown in FIG. 8.

Further fine tuning of the channel paths require the space-frequency channel response from block 506 and estimated coarse bins from block 510-02/03 for spatial narrowband/wideband systems. Immediately we conjugate the channel response for a specific path at block 511-01. After the conjugation step the channel path resembles to the equivalent spatial narrowband model and the low complexity two-stage rotation is depicted in block 511-02. We set the number of first step grid levels in 511-02(*a*). Later, we rotate the space-frequency channel for the first step levels and take the IDFT to get the rotated angle-delay response in 511-02 (*b*). We find the maximum among all the first step levels in 511-02(*c*). Around the first step peak, we set the second step grid points in block 512-02(*d*). Then, we rotate around the current peak with the defined second step levels in both the angle-delay dimensions and take the 2D-IDFT to get the further rotated angle-delay channel in block 511-02(*e*). At last, we find the maximum valued rotation grid for angle-delay channel in 511-02(*f*). Finally, we add the bin offset of the maximum value to the coarse estimate and get the fine tuned DoA-ToA estimate in 511-03.

In a 2D-rotation grid search the proposed rotation methodology drastically reduces the computational complexity to the logarithmic scale, e.g. a $S_\theta \times S_\tau = 100 \times 100$ grid size requires 10000 grid points to be searched whereas in the proposed two-step method the similar accuracy is achieved by just $$S_\theta^1 \times S_\tau^1 + S_\theta^2 \times S_\tau^2 = (10\times 10) + (10\times 10) = 200$$

Figure 7:
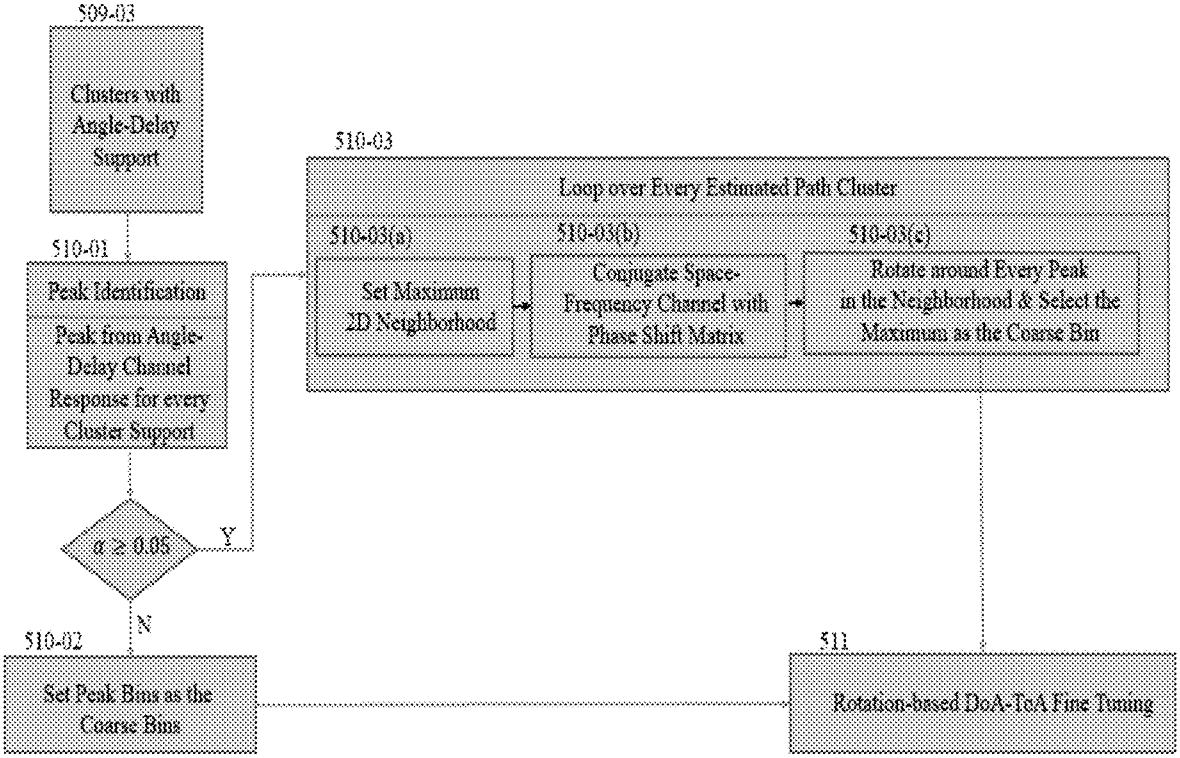
FIG. 7: Peak finding and coarse bin estimation for spatial wideband systems

The inventiveness of the proposed framework in the channel signature estimation systems can be easily identified by the green shaded modules in the figures. In comparison to the prior arts as mentioned in (a), the additionally added modules in FIG. 5 of this disclosure embarks its inventiveness in being first of its kind end-to-end AI enabled framework for path detection and its parameter estimation in the presence of spatial wideband effect while considering both the finite basis leakage effect and the ultra-low SNR at mmWave/THz. The observation of coarse bin shifting due to the spatial wideband effect as shown in FIG. 6 and the proposed two-stage rotation-based solution given in FIG. 7 is not obvious and makes the invention unique.

Example—1

Figure 9:
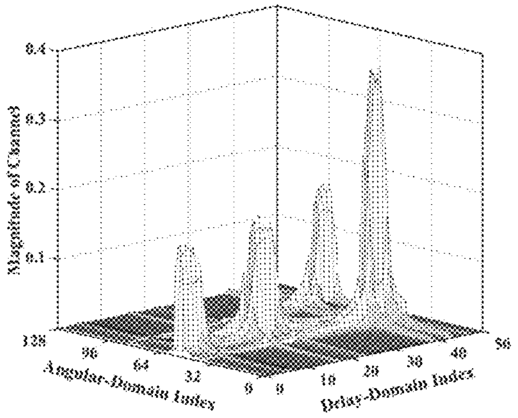
FIG. 9: Channel realization with 4-physical paths at $f_c$=58 GHz, $f_s$=0.2$f_c$
Figure 10:
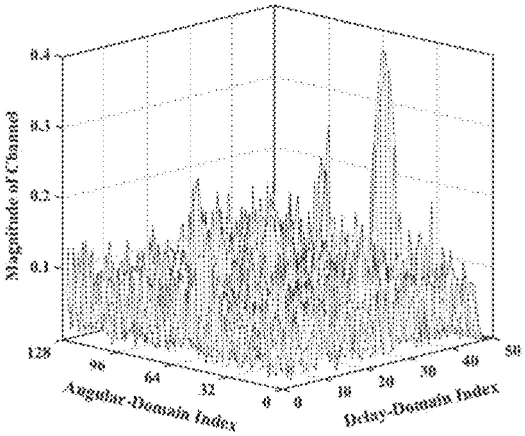
FIG. 10: LS channel estimate at SNR=−15 dB

Denoising Example: The channel response in the angle-delay domain with 4 physical paths is shown in FIG. 9 where the path spread can be clearly seen for a high BW at $\alpha$=0.2. The corresponding LS estimated angle-delay response is given in FIG. 10 for SNR −15 dB and it can be verified that in such an extremely noisy scenario the direct hard threshold cannot provide all the path clusters above the noise floor.

Figure 11:
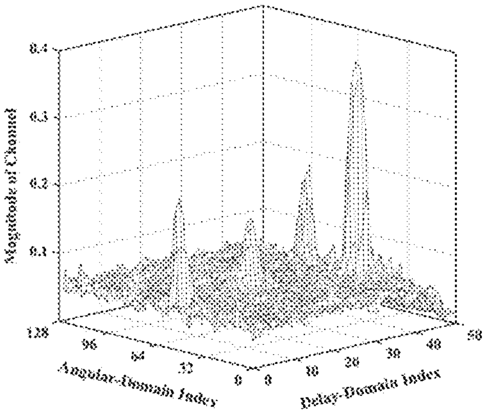
FIG. 11: Channel denoised output with unknown noise variance
Figure 12:
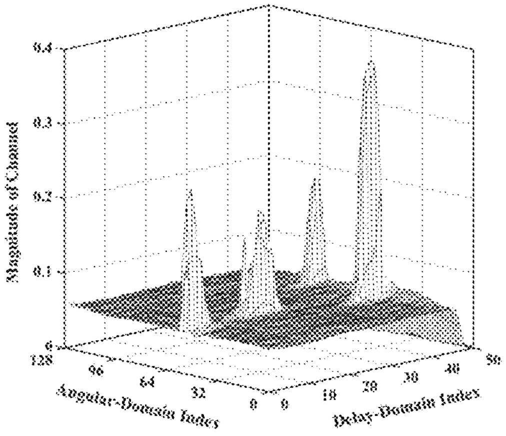
FIG. 12: Channel denoised output with known noise variance

Hence, the DL-based Denoising Convolution Neural Network (DnCNN) denoiser is implemented to the channel response image equivalent to get the denoised channel image. The power of DL method can be clearly seen in FIG. 11 where the paths can be seen recovering above the noise floor when the noise level is assumed to be unknown. Also if the noise level is known, a more clear path recovery is evident from FIG. 12. $f_c$=58 GHz, $f_s$=0.2$f_c$ Clustering Example: Next, to find out the number of clusters present in the denoised channel response along with the corresponding delay angle support to search for the maximum of each cluster as the coarse bin estimate. Now, a hard threshold is put on the denoised channel response to prepare the dataset for proper clustering. In this disclosure, we propose to use the channel sparsity prior and using the percentile threshold over the energy threshold for preparing the cluster dataset.

Example 2

Figure 13:
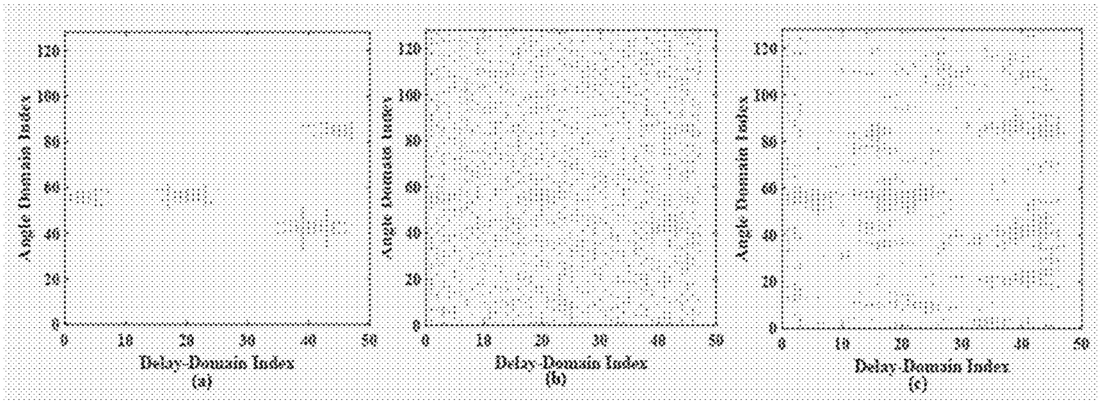
FIG. 13: Prepared clustering dataset using Energy Threshold (a) without noise (b) without Denoising at −15 dB SNR (c) with Denoising at −15 dB

In FIG. 13, an example of the prepared dataset by implementing the energy threshold is presented. It is evident that at −15 dB SNR, the energy threshold identifies numerous noise points.

Figure 14:
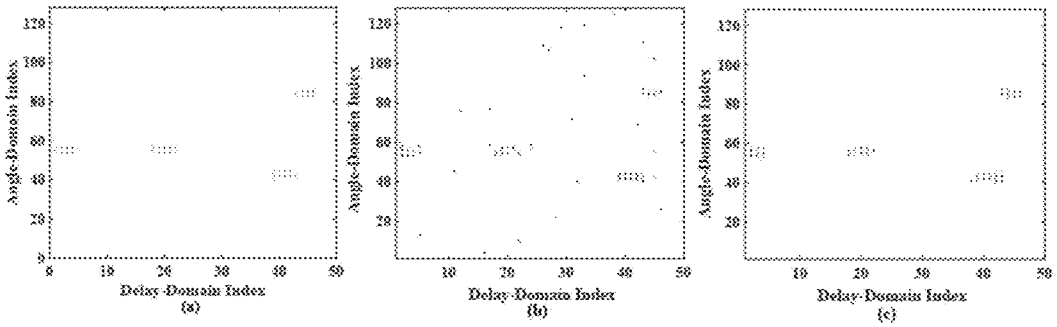
FIG. 14: Prepared clustering dataset using Percentile Threshold (a) without noise (b) without denoising at −15 dB SNR (c) with Denoising at −15 dB
Figure 15:
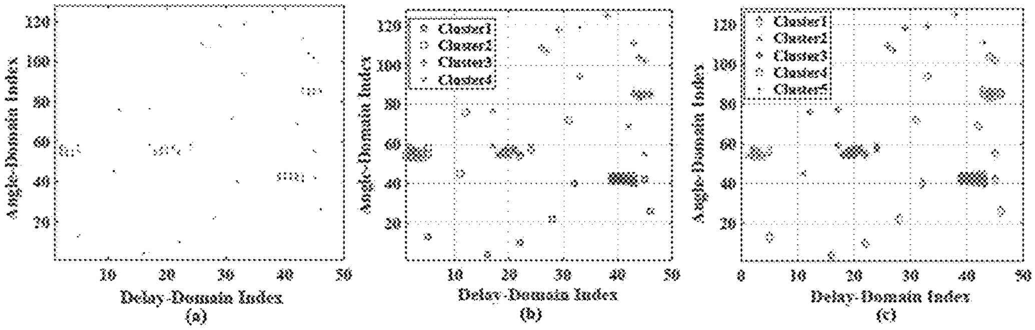
FIG. 15: Clustering output on denoised dataset using percentile threshold (a) prepared dataset (b) k-means with elbow (c) robust LGC (Local Gravitation based Clustering)
Figure 16:
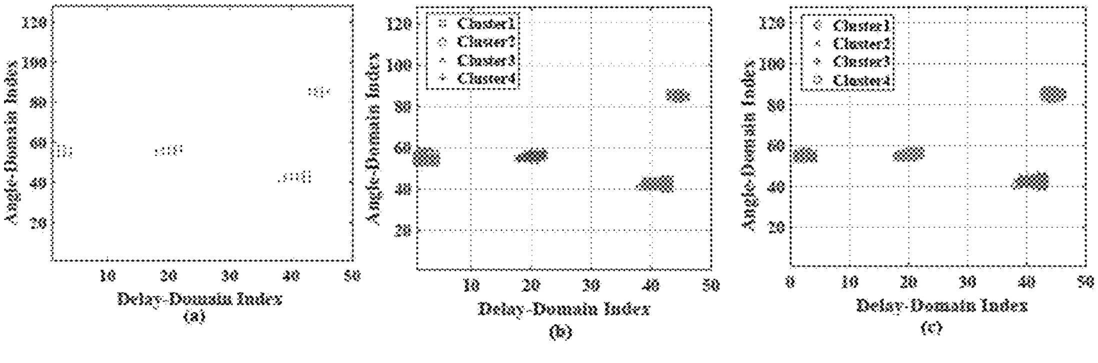
FIG. 16: Clustering output on noisy dataset using percentile threshold (a) prepared dataset (b) k-means with elbow (c) robust LGC

In preparing the clustering dataset by applying the percentile threshold the proper dataset is prepared as shown in FIG. 14. The clustering output with percentile threshold is given in FIG. 15 and FIG. 16 for noisy and denoised channel response, respectively.

Example—3

Figure 17:
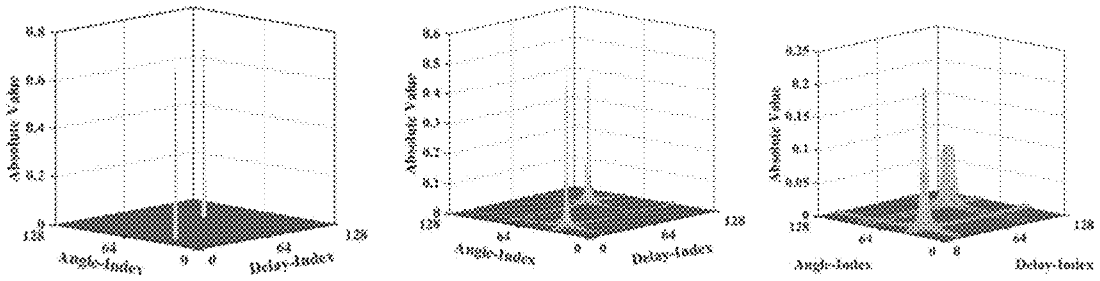
FIG. 17: Angle-Delay channel response for the 2-physical input paths (a) integer multiple and no leakage at a=0.000 (b) non-integer multiple and leakage at $\alpha$=0.001 (c) non-integer multiple and spatial wideband effect at $\alpha$=0.1.

Rotation Example: FIG. 17 illustrates the channel response for R, N=128 with two physical paths. For the two paths with input signature ($\tilde{\theta}_1$, $\tilde{\tau}_1$)=(35/R, 15/N) and ($\tilde{\theta}_1$, $\tilde{\theta}_1$)=(80/R, 88/N) and $\alpha$=0.000, the two paths are exactly localized and for ($\tilde{\theta}_1$, $\tilde{\theta}_1$)=(35.25/R, 15.25/N) and ($\tilde{\theta}_2$, $\tilde{\theta}_2$)=(80.25/R, 88.50/N) and $\alpha$=0.001 the power is leaked. Moreover, for $\alpha$=0.1 the power is further leaked in the delay angle domain.

Figure 18:
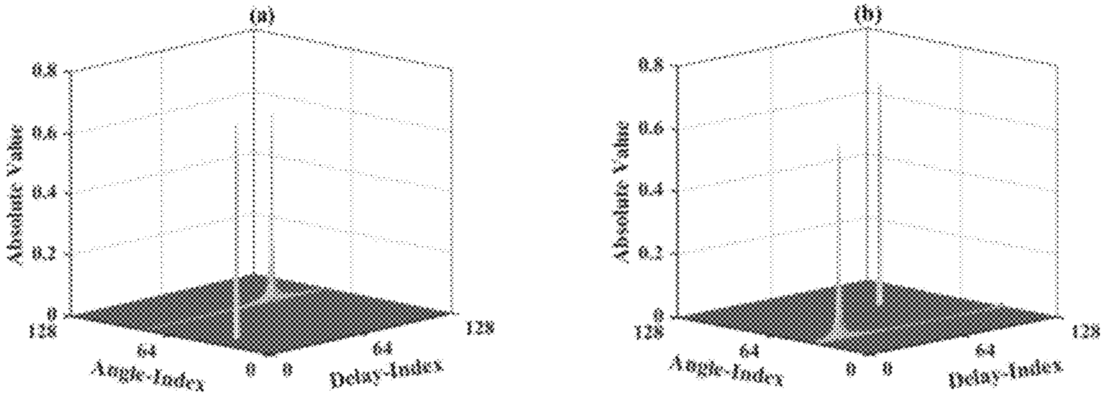
FIG. 18: Fine tuning of the DoA-ToA (direction of arrival and time of arrival) for (a) path-1 (b) path-2.

Spatial Narrowband: With the proposed rotation method the fine-tuning around the coarse bins is illustrated in FIG. 18. In the rotation method DoA-ToA fine-tuning is done one path at a time and the estimated signatures are exact with $S_\theta \times S_\tau$=5×5 fine-tuning rotation grid (with $S_\theta$ and $S_\tau$ being the rotation counts in the angle-delay domain). However, if the fractional part of the signature does not find a point in the fine grid we have to put more number of grids (e.g. ($\tilde{\theta}_1$, $\tilde{\theta}_1$)=(35.121/R, 15.121/N), we need to have $S_\theta \times S_\tau$=121×121 points for the perfect localization, though we can get the same accuracy by the proposed two step method with a quite low computational burden by dividing the search in the $$\text{first stage} - S_\theta^1 \times S_\tau^1 = 11 \times 11$$

and in the $$\text{second stage} - S_\theta^2 \times S_\tau^2 = 11 \times 11$$

where $$S_\theta^1 \text{ and } S_\tau^1$$

are rotation counts in the angle-delay domain in the first stage and $$S_\theta^2 \text{ and } S_\tau^2$$

are rotation counts in the angle-delay domain in the second stage.

Figure 19:
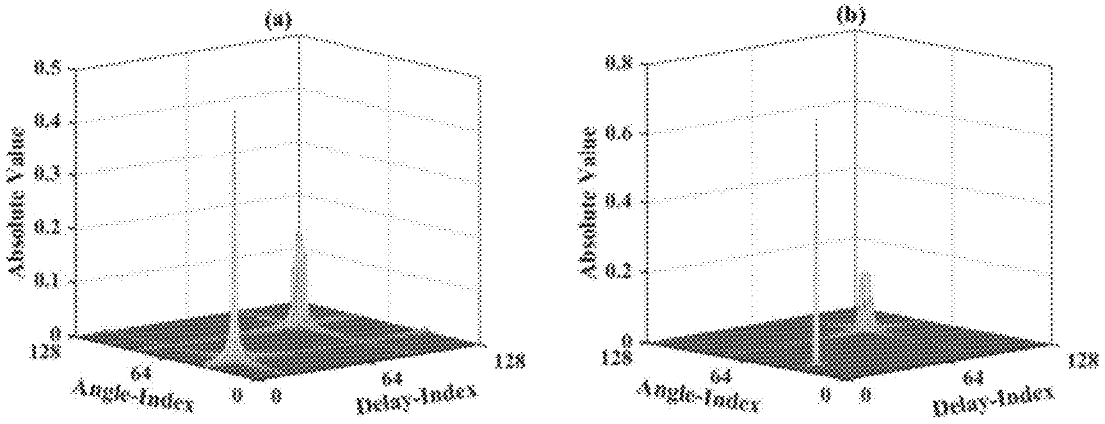
FIG. 19: Fine-Tuning of the DoA-ToA for path-1 with $\alpha$=0.1 (a) single-stage without correction (b) proposed two-stage with coarse correction.
Figure 20:
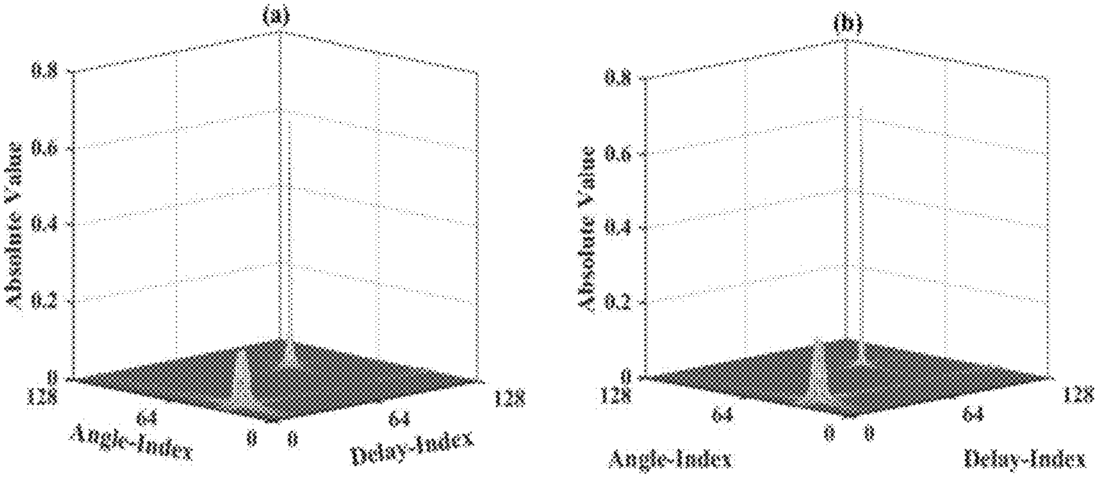
FIG. 20: Fine-Tuning of the DoA-ToA for path-2 with $\alpha$=0.1 (a) single-stage without correction (b) proposed two-stage with coarse correction.

Spatial Wideband: It is important to note that for a spatial wideband system any amount of rotation around the peaks is a waste as due to the SWE the peaks are shifted from the actual coarse signature. This can be seen from the FIG. 19 for path-1. If we do not correct the coarse and rotate around the peak directly, the path power cannot be localized as is evident from FIG. 19(*a*), whereas with the proposed two-stage correction the path power is localized and the fine-tuned DoA-ToA signature can be easily estimated. The similar effect can be seen for the path-2 in FIG. 20.

The novel aspects of the present invention can be summarized as follows:

- Restrictions from finite basis on spatial wideband systems is modelled through Fourier analysis in order to capture the dual wideband spreading of mmWave massive MIMO channel paths.
- A method of modified Fourier based modeling in order to capture the dual wideband spreading of mmWave massive MIMO channel paths.
- A novel Deep Learning based channel response denoising method is proposed for extracting scatter/target of spatial wideband systems in ultra-low SNR.
- An apriori-free Local Gravitation based Clustering (LGC) approach for identifying the number of clusters and their supports in a sparse dual wideband system is proposed.
- A low-complexity rotation-based fine-tuning mechanism is proposed for mitigating the grid mismatch effect.

A two-stage coarse correction and fine-tuned DoA-ToA estimation method is proposed for handling the angle-delay squinting effect in spatial wideband systems.

The current invention (system and method) offers the following advantages: Proposed end-to-end AI-enabled framework effectively identifies the number of channel paths and the respective DoA-ToA signatures for the mmWave/THz multi-antenna systems with spatial wideband and ultra-low SNR effects.

To denoise a 256×256 delay-angle CIR with a Tesla V100-PCIE GPU required run-time is 0.9067 ms.

Requires less computations due to the proposed low complexity binary search in fine-tuning, e.g. the run time complexity of the direct rotation method for the spatial wideband systems with R, N=128 and $S_\theta \times S_\tau = 121 \times 121$ is around 200 ms whereas with $$S_\theta^1 \times S_\tau^1 = 11 \times 11 \text{ and } S_\theta^2 \times S_\tau^2 = 11 \times 11$$

using the proposed method is around 1 ms.

Thus, the present invention enables detecting the number of paths and the associated parameters in a radio environment with the communication signal in the presence of spatial wideband and ultra-low SNR effect. The invented AI-enabled mixed signal processing end-to-end system improves the path detection in ultra-low SNR conditions and low complexity fine-tuning over the existing methods.

We claim:

1. An automated mixed signal processing method for channel path characterization in a radio propagation environment of a GHz (mmWave)/THz multi-antenna-based communication system, the method comprising:

receiving a noise-corrupted RF signal at an RF-front end receiver;

down-converting the noise-corrupted RF signal to obtain a corresponding space-time baseband sequence;

performing serial-to-parallel conversion of said space-time baseband sequence and discarding a Cyclic Prefix (CP) from said converted sequence followed by Discrete Fourier Transform (DFT) thereof;

obtaining a space-frequency noisy channel response from said DFT output through Least Squares (LS) channel estimation;

inverse DFT of said space-frequency noisy channel response to obtain an angle-delay channel response representing dual wideband spreading of channel paths associated with spatial wideband effects;

denoising the angle-delay channel response involving normalizing the angle-delay channel response to obtain a noisy channel image response, Neural Network assisted denoising of the noisy channel image response and converting the denoised channel image response back to an absolute channel response;

preparing a clustering dataset from the denoised absolute channel response;

feeding the prepared dataset to a Local Gravitation based Clustering (LGC) process for identifying a number of clusters and a respective delay-angle support for each identified cluster along with a peak of each identified cluster and obtaining a coarse Direction of Arrival (DoA) and Time of Arrival (ToA) estimate from the identified cluster peak and corresponding delay-angle support;

correcting a peak bin, by setting a maximum two-dimensional neighborhood, conjugating the channel image response by a phase shift matrix at the peak bin, rotating around every peak in the neighborhood, and selecting a maximum as a correct coarse bin estimate;

conjugating the channel response for a specific path and performing a two-stage rotation around the coarse bin by rotating the space-frequency channel response and thereby obtaining rotated angle-delay channel responses;

finding a maximum valued rotation grid and adding a bin offset of the maximum valued rotation grid to the coarse estimate to obtain a fine-tuned Direction of Arrival (DoA) and Time of Arrival (ToA) estimate of the channel path for said channel path characterization.

2. The method as claimed in claim 1, wherein normalizing the angle-delay channel response comprises normalizing the channel response to a grayscale image in the range [0,1] to obtain the noisy channel image response.

3. The method as claimed in claim 1, wherein the denoising comprises passing the noisy channel image response through a pre-trained Denoising Convolution Neural Network (DnCNN) to obtain the denoised channel image response.

4. The method as claimed in claim 1, wherein the preparing of the clustered dataset comprises applying percentile-based hard thresholding over the denoised channel response.

5. The method as claimed in claim 1, wherein the Local Gravitation based Clustering process identifies the number of clusters and the respective delay-angle support for each identified cluster without requiring any additional prior on the number of clusters.

6. The method as claimed in claim 1, wherein performing the two-stage rotation comprises:

setting a first step grid level;

rotating the space-frequency channel response for the first step grid level and taking the inverse Discrete Fourier Transform to obtain the rotated angle-delay channel response;

finding the maximum among the first step grid levels;

setting second step grid points around the first step maximum;

rotating around the first step maximum with the second step grid points in angle and delay dimensions and taking a two-dimensional inverse Discrete Fourier Transform to obtain a further rotated angle-delay channel response;

finding the maximum valued rotation grid; and adding the bin offset of the maximum valued rotation grid to the coarse estimate to obtain the fine-tuned DoA and ToA estimate.

* * * * *